US007336970B2

(12) United States Patent
Oguma (10) Patent No.: US 7,336,970 B2
(45) Date of Patent: Feb. 26, 2008

(54) PORTABLE COMMUNICATION TERMINAL CAPABLE OF COMMUNICATING WITH INFORMATION TERMINAL AND METHOD OF CONVERTING CONTROL PROTOCOL OF THE SAME BETWEEN DIFFERENT KINDS OF NETWORKS

(75) Inventor: Kenji Oguma, Tokyo (JP)

(73) Assignee: NEC Corporation, Tokyo (JP)

( * ) Notice: Subject to any disclaimer, the term of this patent is extended or adjusted under 35 U.S.C. 154(b) by 1137 days.

(21) Appl. No.: 10/608,555

(22) Filed: Jun. 30, 2003

(65) Prior Publication Data

US 2004/0053636 A1 Mar. 18, 2004

(30) Foreign Application Priority Data

Jun. 28, 2002 (JP) ............................. 2002-190110

(51) Int. Cl.
*H04Q 7/24* (2006.01)

(52) U.S. Cl. ............................. 455/550.1; 455/426.1; 455/435.1; 455/552.1; 455/553.1; 370/338

(58) Field of Classification Search ................ 455/403, 455/422.1, 426.1, 432.1, 432.2, 435.1, 439, 455/448, 550.1, 552.1, 553.1; 370/338, 352–354
See application file for complete search history.

(56) References Cited

U.S. PATENT DOCUMENTS 6,233,273 B1 5/2001 Webster et al.

| | | | |
|---|---|---|---|
| 6,526,034 B1 | 2/2003 | Gorsuch | |
| 2003/0109987 A1* | 6/2003 | Barman et al. | ............. 701/213 |
| 2007/0091845 A1* | 4/2007 | Brideglall | .................. 370/331 |

FOREIGN PATENT DOCUMENTS

JP 2003-510897 W 3/2003

* cited by examiner

*Primary Examiner*—Binh K. Tieu
(74) *Attorney, Agent, or Firm*—Foley & Lardner LLP

(57) ABSTRACT

In a portable communication terminal 10 which is capable of communicating with an information terminal 20 between different kinds of networks, the portable communication terminal 10 includes a plurality of radio communication sections 11, 21 which carry out data communications, respectively in respective service areas of the different kinds of networks, data communication control sections 12, 22 which control the data communications of a plurality of radio communication sections 11, 21 by their own first control commands of respective radio communication sections 11, 21, and a command conversion section 13 which carries out conversion of the first control commands used by the data communication control sections 12, 22 and a second control command used for a communication with the information terminal 20.

16 Claims, 5 Drawing Sheets

FIG. 1 (PRIOR ART)

PORTABLE COMMUNICATION TERMINAL CAPABLE OF COMMUNICATING WITH INFORMATION TERMINAL AND METHOD OF CONVERTING CONTROL PROTOCOL OF THE SAME BETWEEN DIFFERENT KINDS OF NETWORKS

BACKGROUND OF THE INVENTION

The present invention relates to a portable communication terminal which is capable of communicating with an information terminal, in particular to a method of converting a control protocol of the portable communication terminal between different kinds of networks.

Conventionally, an AT (Attention) command system is used in controlling data communication during data communication, and the like between a portable communication terminal and an information terminal capable of communicating with the portable communication terminal. In the AT command system, a control command and a data array are time-divisionally transferred in the same interface. A wireless WAN (Wide Area Network) CDMA (Carrier Division Multiple Access) communication section is formed in the portable communication terminal. The wireless WAN CDMA communication section carries out transmission and reception of communication data in a wireless WAN service area.

A wireless WAN data communication control block is connected to the wireless WAN CDMA communication section through a data interface. The wireless WAN data communication control block controls a communication in the wireless WAN CDMA communication section. The wireless WAN data communication control block receives a reception data from the wireless WAN CDMA communication section and sends a transmission data to the wireless WAN CDMA communication section. A command/data separation block is connected to the wireless WAN data communication control block through an interface and another interface. The command/data separation block separates a control command and a data array both transferred in the AT command system from each other. Between the command/data separation block and the wireless WAN data communication control block, a transfer of transmission and reception data is carried out through the interface while a transfer of a control command is carried out through the interface.

A portable communication apparatus external interface block is connected to the command/data separation block through a command data interface. Between the portable communication apparatus external interface block and the command/data separation block, a transfer of the control command and the data array both in the AT command system from the information terminal is carried out through a data interface.

In the interim, in the above-mentioned portable communication terminal, only one command data interface exists between the portable communication apparatus external interface block and the command/data separation block. As a result, the information terminal cannot send a control command to the portable communication terminal during data communication.

It is therefore necessary that the information terminal always monitors whether or not the portable communication terminal is during the data communication and so cannot receive the control command. Further, when the information terminal sends the control command, the information terminal must send the control command after enabling the portable communication terminal to receive the control command by the use of an especial sequence. Moreover, when necessary, the information terminal must turn the portable communication terminal to be capable of the data communication again after finishing the sending of the control command.

On the other hand, for example, a protocol called NDIS (Network Driver Interface Specification) is used for a control command in general LAN (Local Area Network) equipment. It is thereby possible to send the control command, even though the general LAN equipment is during data communication.

Under the circumstances, let the above-mentioned portable communication terminal be supplied not only with a data transmission and reception function by a wireless WAN but also with a data transmission and reception function by a wireless LAN. Accordingly, a method of controlling command/data communication in a case the wireless WAN is effective is different from a method of controlling command/data communication in a case the wireless LAN is effective. As a result, the conventional portable communication terminal has a problem that a method of controlling the portable communication terminal for the data communication becomes complicated.

Further, in the wireless WAN communication, the control command cannot be issued during data communication. As a result, an operation of the information terminal in a case of effective wireless LAN becomes different from that in a case of effective wireless WAN. It is therefore feared that a user of the information terminal comes to be confused.

On the other hand, if the control commands for the portable communication terminal in the wireless WAN is restricted to the NDIS protocol, it is feared that conventional application software installed in the information terminal become inoperable. Moreover, in a development of the portable communication terminal itself, a period for the development thereof is extended, since the conventional wireless WAN data communication control block is unable to be used.

SUMMARY OF THE INVENTION

It is therefore an object of the present invention to provide a portable communication terminal capable of communicating with an information terminal and a method of converting control protocol of the portable communication terminal between different kinds of networks, that can render a method of controlling data communication to be readily conducted, even if the portable communication terminal has functions of both wireless WAN and wireless LAN, and that, even if the wireless WAN or the wireless LAN is effective in the information terminal, can prevent an user of the information terminal from being confused due to different operations of the wireless WAN and the wireless LAN on the information terminal.

It is another object of the present invention to provide a portable communication terminal capable of communicating with an information terminal and a method of converting control protocol of the portable communication terminal between different kinds of networks, that can, even if the control command in the wireless WAN is restricted to the NDIS protocol, prevent application software installed in the information terminal from being inoperable.

It is yet another object of the present invention to provide a portable communication terminal capable of communicating with an information terminal and a method of converting control protocol of the portable communication terminal between different kinds of networks, that can prevent a period for a development of the portable communication terminal from being extended on the ground that an wireless WAN data communication control block is unable to be used.

Other objects of the present invention will become clear as the description proceeds.

According to an aspect of the present invention, there is provided a portable communication terminal which is capable of communicating with an information terminal between different kinds of networks, comprising: a plurality of radio communication sections which carry out data communications, respectively in respective service areas of the different kinds of networks; a data communication control section which controls the data communications of a plurality of radio communication sections by their own first control commands of respective radio communication sections; and a command conversion section which carries out conversion of the first control commands used by the data communication control section and a second control command used for a communication with the information terminal.

According to another aspect of the present invention, there is also provided a portable communication terminal which is capable of communicating with an information terminal in an wireless WAN and an wireless LAN, comprising: an wireless WAN communication section which has a function of access to the wireless WAN; an wireless LAN communication section which has a function of access to the wireless LAN; an wireless LAN data communication control section which controls data communication of the wireless LAN communication section by a control command of the wireless LAN and which simultaneously communicating with the information terminal at the control command of the wireless LAN; an wireless WAN data communication control section which controls data communication of the wireless WAN communication section by a control command of the wireless WAN; and an wireless WAN command conversion section which carries out conversion of the control command of the wireless WAN and the control command of the wireless LAN between the wireless WAN data communication control section and the information terminal.

The communication may be carried out between the portable communication terminal and the information terminal by a control protocol for the wireless LAN communication section.

The wireless WAN command conversion section may convert the control command of the wireless WAN into the control command of the wireless LAN during an wireless WAN data reception while the wireless WAN command conversion section converts the control command of the wireless LAN into the control command of the wireless WAN during an wireless WAN data transmission.

The wireless WAN command conversion section may convert an NDIS command as a control command for the wireless LAN communication section into an AT command as a control command for the wireless WAN communication section.

The wireless WAN command conversion section may convert first control information including a report for a radio wave condition during data reception and charging information into second control information capable of being used in the wireless LAN communication section and then transfers the second control information to the information terminal.

The wireless LAN data communication control section, the wireless WAN command conversion section may have functions to constitute or dissolve transmission and reception data from the portable communication terminal to the information terminal or from the information terminal to the portable communication terminal into a packet array defined by LAN, respectively.

The wireless LAN data communication control section, the wireless WAN command conversion section may have functions to divide or combine each packet of the transmission and reception data into a designated packet size, respectively.

The portable communication terminal which is capable of communicating with an information terminal in an wireless WAN and an wireless LAN may further comprise a portable communication apparatus external interface block with respect to the information terminal, wherein data interfaces carrying out transmission and reception of the data, a transfer of the control command, independently, are formed between the portable communication apparatus external interface block and the wireless WAN command conversion section, the wireless LAN data communication control section, respectively.

A data interface for transferring the control command, a data interface for transferring the transmission and reception data, and a data interface for transferring information that data communication in the wireless LAN and in the wireless WAN become effective may be formed in parallel by separate paths between the portable communication apparatus external interface block and the information terminal.

The data interface for transferring the control command, the data interface for transferring the transmission and reception data, and the data interface for transferring information that data communication in the wireless LAN and in the wireless WAN become effective each between the portable communication apparatus external interface block and the information terminal may be formed by USB interfaces, respectively.

The wireless WAN command conversion section, at the time of access to the wireless WAN, may inform the wireless LAN communication section that the wireless WAN is effective at the present and make the wireless LAN communication section stop the communication, and the wireless LAN data communication control section, at the time of access to the wireless LAN, may inform the wireless WAN communication section that the wireless LAN is effective at the present and make the wireless WAN communication section stop the communication.

The wireless LAN effective line may be formed between the wireless WAN command conversion section and the wireless LAN data communication control section while an wireless WAN effective line is formed between the wireless WAN data communication control section and the wireless LAN data communication control section, the wireless LAN effective line becoming active for informing that the wireless LAN is effective at the present from the wireless LAN data communication control section to the wireless WAN command conversion section, and the wireless WAN effective line becoming active for informing that the wireless WAN is effective at the present from the wireless WAN data communication control section to the wireless LAN data communication control section.

The information that data communication in the wireless WAN is effective at the present may be sent to the information terminal and displayed in the information terminal at the time of access to the wireless WAN, and wherein information that data communication in the wireless LAN is effective at the present is sent to the information terminal and displayed in the information terminal at the time of access to the wireless LAN.

The wireless LAN data communication control section may request the information terminal an admittance procedure of the wireless LAN and the information terminal is informed that the data communication in the wireless LAN is effective after completion of the admittance procedure of the wireless LAN, when switching from the wireless WAN into the wireless LAN is carried out, and the wireless WAN command conversion section may request the information terminal an admittance procedure of the, wireless WAN and the information terminal is informed that the data communication in the wireless WAN is effective after completion of the admittance procedure of the wireless WAN, when switching from the wireless LAN into the wireless WAN is carried out.

According to yet another aspect of the present invention, there is also provided a method of converting a control protocol of a portable communication terminal which is capable of communicating with an information terminal between different kinds of networks, the method comprising the steps of: carrying out data communications separately in respective service areas of the different kinds of networks; controlling the data communications by control commands used in respective networks; and carrying out conversion of the control commands used in respective networks and a control command used in the information terminal.

DETAILED DESCRIPTION OF THE PREFERRED EMBODIMENT

Figure 1:
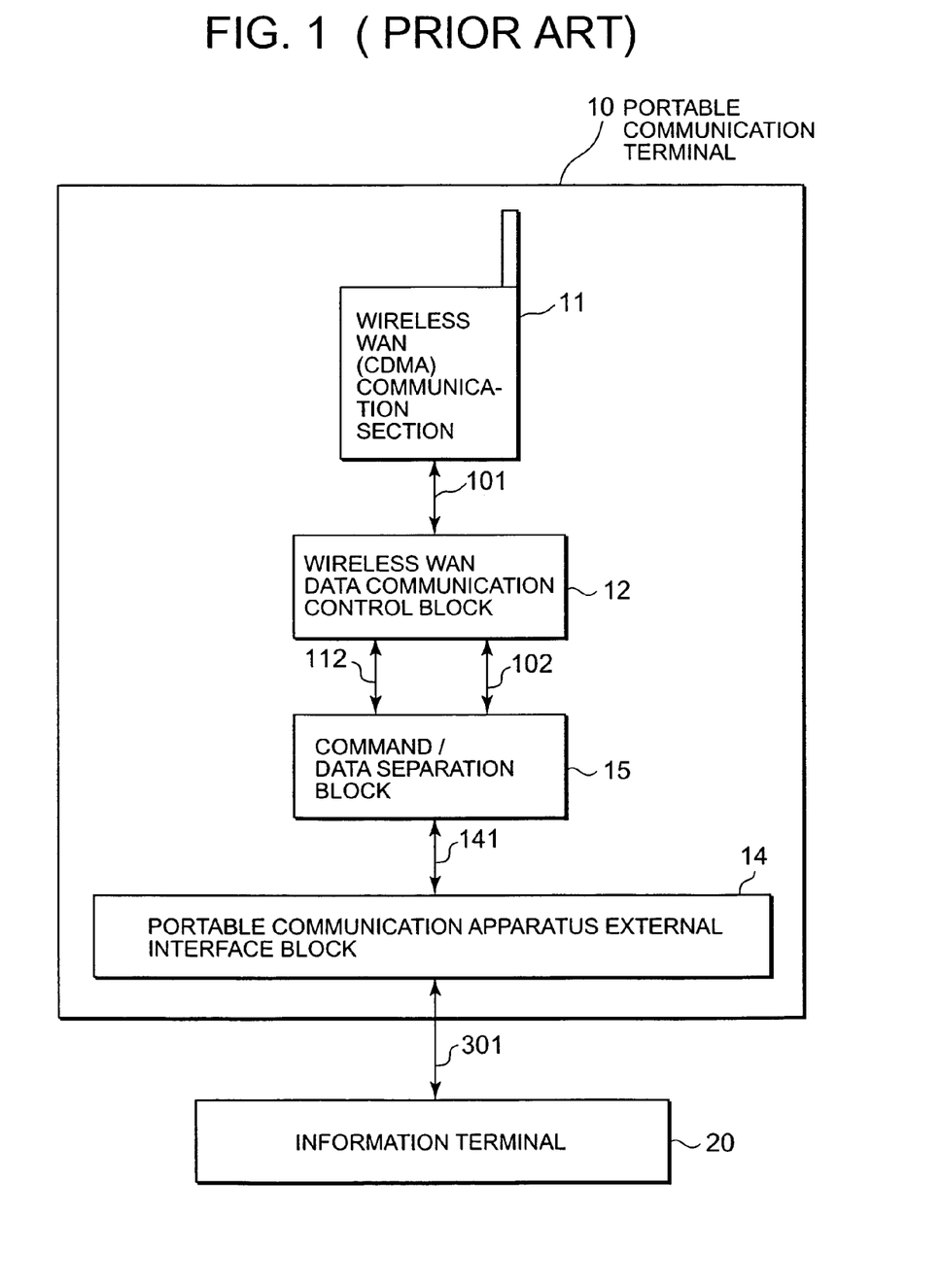
FIG. 1 is a block diagram for schematically showing a constitution of a conventional portable communication terminal capable of communicating with an information terminal.

Referring to FIG. 1, description is, at first made about a conventional portable communication terminal capable of communicating with an information terminal in order to facilitate an understanding of the present invention. FIG. 1 schematically shows a constitution of the conventional portable communication terminal capable of communicating with an information terminal. Besides, similar portions are designated by like reference numerals over all of the drawings.

As illustrated in FIG. 1, an AT (Attention) command system is used in controlling data communication during data communication, and the like between a portable communication terminal 10 and an information terminal 20 capable of communicating with the portable communication terminal. In the AT command system, a control command and a data array are time-divisionally transferred in the same interface.

A wireless WAN (Wide Area Network) CDMA (Carrier Division Multiple Access) communication section 11 is formed in the portable communication terminal 10. The wireless WAN CDMA communication section 11 carries out transmission and reception of communication data in a wireless WAN service area.

A wireless WAN data communication control block 12 is connected to the wireless WAN CDMA communication section 11 through a data interface 101. The wireless WAN data communication control block 12 controls a communication in the wireless WAN CDMA communication section 11. The wireless WAN data communication control block 12 receives a reception data from the wireless WAN CDMA communication section 11 and sends a transmission data to the wireless WAN CDMA communication section 11.

A command/data separation block 15 is connected to the wireless WAN data communication control block 12 through an interface 102 and an interface 112. The command/data separation block 15 separates a control command and a data array both transferred in the AT command system from each other. Between the command/data separation block 15 and the wireless WAN data communication control block 12, a transfer of transmission and reception data is carried out through the interface 112 while a transfer of a control command is carried out through the interface 102.

A portable communication apparatus external interface block 14 is connected to the command/data separation block 15 through a command data interface 141. Between the portable communication apparatus external interface block 14 and the command/data separation block 15, a transfer of the control command and the data array both in the AT command system from the information terminal 20 is carried out through a data interface 301.

In the interim, in the above-mentioned portable communication terminal 10, only one command data interface 141 exists between the portable communication apparatus external interface block 14 and the command/data separation block 15. As a result, the information terminal 20 cannot send a control command to the portable communication terminal 10 during data communication.

It is therefore necessary that the information terminal 20 always monitors whether or not the portable communication terminal 10 is during the data communication and so cannot receive the control command. Further, when the information terminal 20 sends the control command, the information terminal 20 must send the control command after enabling the portable communication terminal 10 to receive the control command by the use of an especial sequence. Moreover, when necessary, the information terminal 20 must turn the portable communication terminal 10 to be capable of the data communication again after finishing the sending of the control command.

On the other hand, for example, a protocol called NDIS (Network Driver Interface Specification) is used for a control command in general LAN (Local Area Network) equipment. It is thereby possible to send the control command, even though the general LAN equipment is during data communication.

Under the circumstances, let the above-mentioned portable communication terminal 10 be supplied not only with a data transmission and reception function by a wireless WAN but also with a data transmission and reception function by a wireless LAN. Accordingly, a method of controlling command/data communication in a case the wireless WAN is effective is different from a method of controlling command/data communication in a case the wireless LAN is effective. As a result, the conventional portable communication terminal 10 has a problem that a method of controlling the portable communication terminal 10 for the data communication becomes complicated.

Further, in the wireless WAN communication, the control command cannot be issued during data communication. As a result, an operation of the information terminal 20 in a case of effective wireless LAN becomes different from that in a case of effective wireless WAN. It is therefore feared that a user of the information terminal 20 comes to be confused.

On the other hand, if the control commands for the portable communication terminal 10 in the wireless WAN is restricted to the NDIS protocol, it is feared that conventional application software installed in the information terminal 20 become inoperable. Moreover, in a development of the portable communication terminal 10 itself, a period for th development thereof is extended, since the conventional wireless WAN data communication control block 12 is unable to be used.

Figure 2:
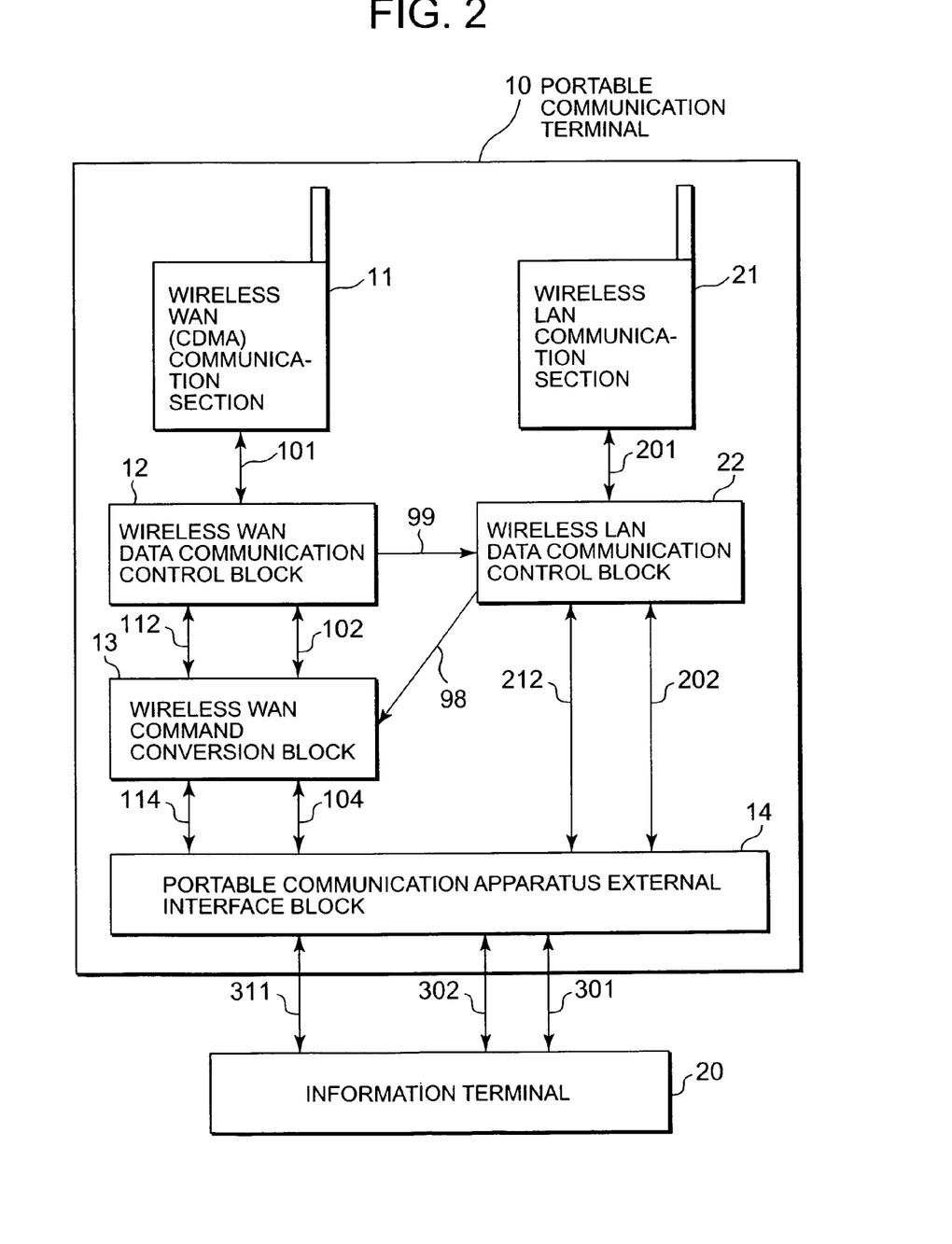
FIG. 2 is a block diagram for schematically showing a constitution of a portable communication terminal according to an embodiment of the present invention which is capable of communicating with an information terminal.

Now, referring to FIG. 2, description will proceed to a portable communication terminal capable of communicating with an information terminal according to an embodiment of the present invention. FIG. 2 is a block diagram for schematically showing a constitution of a portable communication terminal capable of communicating with an information terminal according to an embodiment of the present invention, in which both the portable communication terminal and the information terminal are connected to different kinds of networks from each other.

As illustrated in FIG. 2, both a wireless LAN communication section 21 and a wireless WAN communication section 11 are formed in a portable communication terminal 10. The wireless LAN communication section 21, the wireless WAN communication section 11 transmits and receives communication data in a wireless LAN service area, a wireless WAN service area, respectively.

Further, it is assumed that an NDIS protocol for the wireless LAN communication section 21 is used in controlling data communication during data communication, and the like, between the portable communication terminal 10 and an information terminal 20 capable of communicating with the portable communication terminal 10.

In FIG. 2, the wireless WAN communication section 11, the wireless WAN data communication control block 12, and the portable communication apparatus external interface block 14 are used similarly to those of FIG. 1. Each of the wireless WAN communication section 11 and the wireless WAN data communication control block 12 does not have a function of access to an wireless LAN but has a function of access to an wireless WAN. A wireless LAN data communication control block 22 is connected to the wireless LAN communication section 21 through a data interface 201. Although the wireless LAN data communication control block 22 has a function of access to an wireless LAN, the wireless LAN data communication control block 22 does not have a function of access to an wireless WAN. The wireless LAN data communication control block 22 controls communication of the wireless LAN communication section 21. Accordingly, the wireless LAN data communication control block 22 receives a reception data from the wireless LAN communication section 21 and sends a transmission data to the wireless LAN communication section 21. The wireless LAN data communication control block 22 constitutes or dissolves the transmission and reception data into a packet array defined by LAN. The constitution or dissolution of the packet array is carried out in order that a uniform data processing may be conducted in the information terminal 20.

A portable communication apparatus external interface block 14 is connected to the wireless LAN data communication control block 22 through data interfaces 212, 202. Between the portable communication apparatus external interface block 14 and the wireless LAN data communication control block 22, a transfer of the transmission and reception data is carried out through the data interface 212.

On the other hand, between the portable communication apparatus external interface block 14 and the wireless LAN data communication control block 22, a transfer of a control command for controlling the wireless LAN is carried out through the data interface 202.

Next, as mentioned before, the wireless WAN CDMA communication section 11 sends a reception data to the wireless WAN data communication control block 12 through the data interface 101 and receives a transmission data from the wireless WAN data communication control block 12.

The wireless WAN data communication control block 12 is similar to that of the conventional portable communication terminal 10 having no function of access to wireless LAN. Accordingly, the wireless WAN data communication control block 12 is adjusted to use an AT command as a control command.

A wireless WAN command conversion block 13 is connected to the wireless WAN data communication control block 12 through the data interfaces 112, 102. The wireless WAN command conversion block 13 is newly added in this invention. Between the wireless WAN command conversion block 13 and the wireless WAN data communication control block 12, a transfer of the transmission and reception data is carried out through the data interface 112.

Further, between the wireless WAN command conversion block 13 and the wireless WAN data communication control block 12, a transfer of a control command for controlling the wireless WAN is carried out through the data interface 102.

A portable communication apparatus external interface block 14 is connected to the wireless WAN command conversion block 13 through data interfaces 114, 104.

Between the portable communication apparatus external interface block 14 and the wireless WAN command conversion block 13, a transfer of the transmission and reception data is carried out through the data interface 114.

Further, between the portable communication apparatus external interface block 14 and the wireless WAN command conversion block 13, a transfer of a control command for controlling the wireless LAN is carried out through the data interface 104.

The wireless WAN command conversion block 13 carries out conversions of a control command regarding data communication of the wireless WAN and a control command regarding data communication of the wireless LAN into each other.

Namely, the wireless WAN command conversion block 13 converts the control command regarding data communication of the wireless LAN into the control command regarding data communication of the wireless WAN during data transmission. On the contrary, the wireless WAN command conversion block 13 converts the control command regarding data communication of the wireless WAN into the control command regarding data communication of the wireless LAN during data reception.

By the conversions, it becomes possible to conduct not only the wireless LAN data communication but also the wireless WAN data communication in spite of a single control command.

In addition, the wireless WAN command conversion block 13 constitutes or dissolves the transmission and reception data sent from the data interface 112 into a packet array defined by LAN. The wireless WAN command conversion block 13 transfers the packet array to the portable communication apparatus external interface block 14 and receives the packet array from the portable communication apparatus external interface block 14 through the data interface 114. By the constitution or dissolution of the packet array, a uniform data processing can be conducted in the information terminal 20.

The information terminal 20 is connected to the portable communication apparatus external interface block 14 through a data interface 301 for transferring the control command, a data interface 302 for transferring information of effective networks, and a data interface 311 for transferring the transmission and reception data.

Accordingly, an issue of a control command and a transfer of information of the effective networks can be carried out, even though those are carried out during data communication at the time of access to an wireless WAN.

An USB (Universal Serial Bus) interface is used as the data interface 301, the data interface 302, and the data interface 311. In the USB interface, a command interface pipe 301, a network-selecting indicator interface pipe 302, and a data interface pipe 311 exist as different pipes (paths), respectively. Communication can be conducted between the portable communication terminal 10 and the information terminal 20 through the command interface pipe 301, the network-selecting indicator interface pipe 302, and the data interface pipe 311, respectively, in parallel.

With the structure, the communication can be readily conducted between the portable communication terminal 10 and the information terminal 20, since the USB interface is used.

Further, a wireless LAN effective line 98 is connected between the wireless LAN data communication control block 22 and the wireless WAN command conversion block 13. The wireless LAN effective line 98 becomes active, when the wireless WAN command conversion block 13 is informed, by the wireless LAN data communication control block 22, of the fact that the wireless LAN is effective at the present.

In a case that an active condition of the wireless LAN effective line 98 is detected, the wireless WAN command conversion block 13 demands a stop of the communication from the wireless WAN data communication control block 12.

Further, a wireless WAN effective line 99 is connected between the wireless LAN data communication control block 22 and the wireless WAN data communication control block 12. The wireless WAN effective line 99 becomes active, when the wireless LAN data communication control block 22 is informed, by the wireless WAN data communication control block 12, of the fact that the wireless WAN is effective at the present.

In a case that an active condition of the wireless WAN effective line 99 is detected, the wireless LAN data communication control block 22 stops the communication.

Thus, switching between the wireless WAN and the wireless LAN can be readily achieved.

Figure 3:
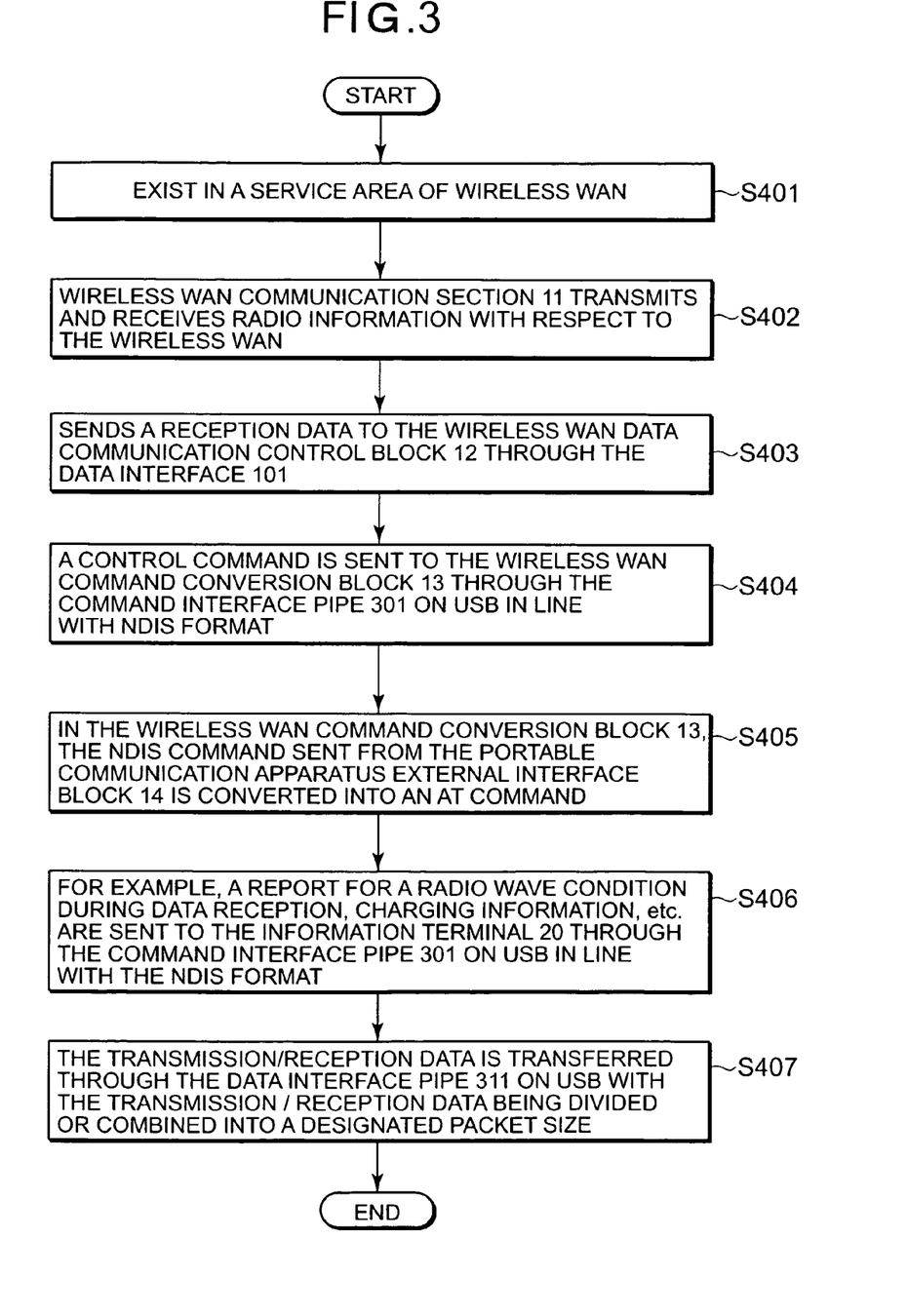
FIG. 3 is a flow chart for explaining a sequence of operations of the embodiment of the present invention in a case that the portable communication terminal exists in a service area of the wireless LAN.

FIG. 3 is a flow chart for explaining a sequence of operations of the embodiment of the present invention in a case that the portable communication terminal 10 exists in a service area of the wireless LAN.

As illustrated in FIG. 3, it is assumed that the portable communication terminal 10 exists in a service area of the wireless LAN (step S401).

The wireless WAN communication section 11 transmits and receives radio information with respect to the wireless WAN (step S402).

The wireless WAN communication section 11 sends a reception data to the wireless WAN data communication control block 12 through the data interface 101 (step S403).

A control command is sent from the portable communication apparatus external interface block 14 to the wireless WAN command conversion block 13 through the command interface pipe 301 on USB in line with the NDIS format (step S404).

In the wireless WAN command conversion block 13, the NDIS command sent from the portable communication apparatus external interface block 14 is converted into an AT command (step S405).

Besides, only the NDIS control command has already been sent in the command interface pipe 301 on USB. It is therefore not necessary that the wireless WAN command conversion block 13 carries out actions for synthesis and separation of a command array and transmission/reception data especially required for the AT command.

For example, a report for a radio wave condition during data reception, charging information, and the like are sent to the information terminal 20 through the command interface pipe 301 on USB in line with the NDIS format (step S406). As a result, a transfer of control information can be carried out, even though the portable communication terminal 10 is during data communication with the information terminal 20 through the wireless WAN.

The transmission/reception data is transferred through the data interface pipe 311 on USB with the transmission/reception data being divided or combined into a designated packet size (step S407).

Figure 4:
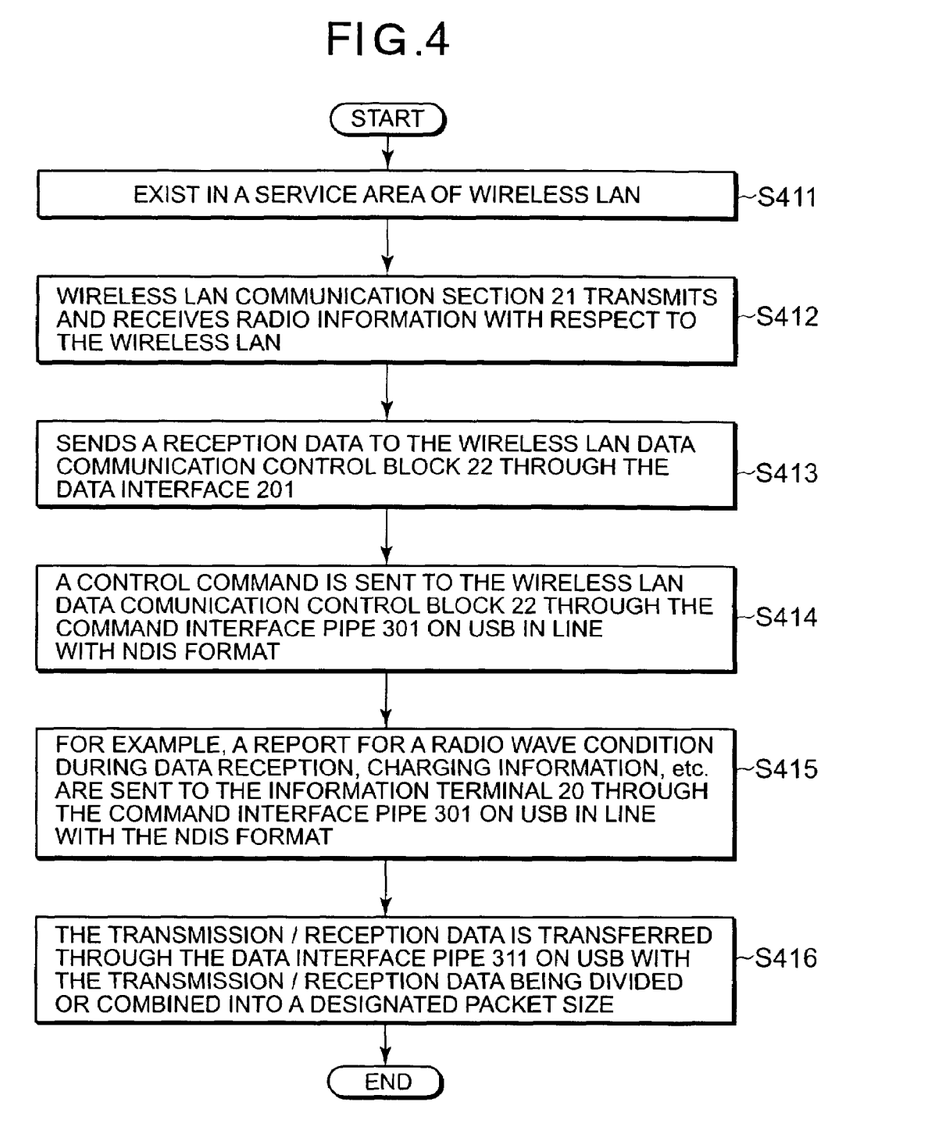
FIG. 4 is a flow chart for explaining an example of a sequence of operations of the embodiment of the present invention in a case that the portable communication terminal exists in a service area of the wireless WAN.

FIG. 4 is a flow chart for explaining an example of a sequence of operations of the embodiment of the present invention in a case that the portable communication terminal 10 exists in a service area of the wireless WAN.

As illustrated in FIG. 4, it is assumed that the portable communication terminal 10 exists in a service area of the wireless WAN (step S411).

The wireless LAN communication section 21 transmits and receives radio information with respect to the wireless LAN (step S412).

The wireless LAN communication section 21 sends a reception data to the wireless LAN data communication control block 22 through the data interface 201 (step S413).

A control command is sent to the wireless LAN data communication control block 22 through the command interface pipe 301 on USB in line with the NDIS format (step S414).

For example, a report for a radio wave condition during data reception, charging information, and the like are sent to the information terminal 20 through the command interface pipe 301 on USB in line with the NDIS format (step S415).

The transmission/reception data is transferred through the data interface pipe 311 on USB with the transmission/reception data being divided or combined into a designated packet size (step S416).

Figure 5:
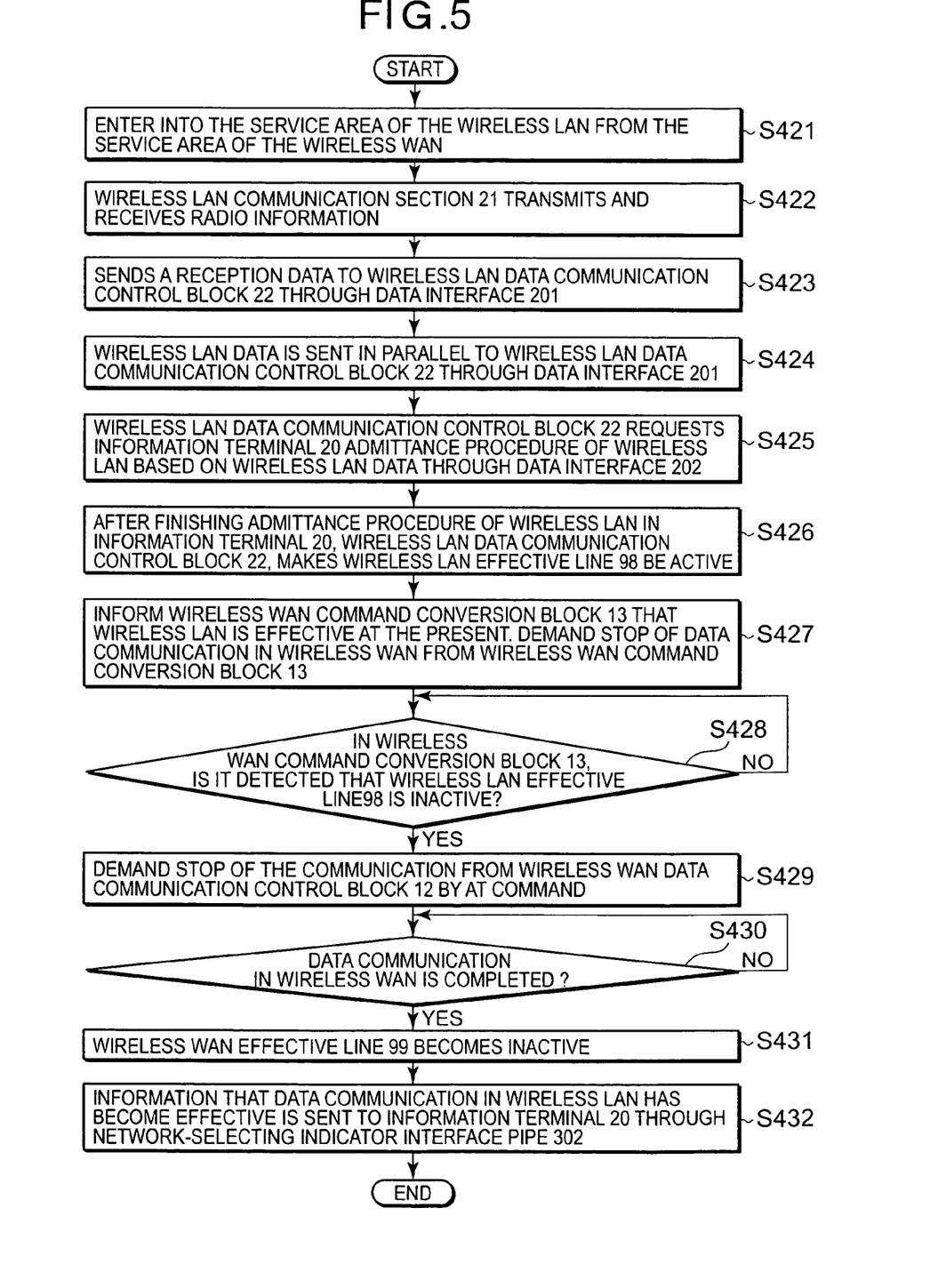
FIG. 5 is a flow chart for explaining an example of operations of the embodiment of the present invention in a case that the wireless WAN data communication is switched into the wireless LAN data communication.

FIG. 5 is a flow chart for explaining an example of operations of the embodiment of the present invention in a case that the wireless WAN data communication is switched into the wireless LAN data communication.

As illustrated in FIG. 5, when the portable communication terminal 10 is moving in a boundary of a service area of the wireless LAN, it is, for example, assumed that the portable communication terminal 10 enters from a service-area of the wireless WAN into the service area of the wireless LAN (step S421).

The wireless LAN communication section 21 transmits and receives radio information with respect to the wireless LAN (step S422).

The wireless LAN communication section 21 sends a reception data to the wireless LAN data communication control block 22 through the data interface 201 (step S423).

An wireless LAN data that has not yet been output from the wireless LAN communication section 21 is sent in parallel to the wireless LAN data communication control block 22 through the data interface 201 (step S424).

The wireless LAN data communication control block 22 requests the information terminal 20 an admittance procedure of the wireless LAN based on the wireless LAN data through the data interface 202 (step S425).

After finishing the admittance procedure of the wireless LAN in the information terminal 20, the wireless LAN data communication control block 22 makes the wireless LAN effective line 98 be active (step S426). Accordingly, the portable communication terminal 10 can be prevented from being abused.

The wireless LAN data communication control block 22 informs the wireless WAN command conversion block 13 of the fact that the wireless LAN is effective at the present. In addition, the wireless LAN data communication control block 22 demands a stop of data communication operation in the wireless WAN from the wireless WAN command conversion block 13 (step S427).

In the wireless WAN command conversion block 13, it is detected that the wireless LAN effective line 98 is inactive (step S428). When the wireless LAN effective line 98 is detected to be inactive, an operation proceeds to the next step.

The wireless WAN command conversion block 13 demands a stop of the communication from the wireless WAN data communication control block 12 by AT command (step S429).

When the data communication in the wireless WAN is completed, an operation proceeds to the next step (step S430).

When the data communication is completed, the wireless WAN effective line 99 becomes inactive (step S431).

An information that data communication in the wireless LAN has become effective is sent to the information terminal 20 through the network-selecting indicator interface pipe 302 and displayed in the information terminal 20 (step S432).

As described above, according to the embodiment of the present invention, provided is a portable communication terminal which is capable of communicating with an information terminal between different kinds of networks comprising: a plurality of radio communication sections which carry out data communications, respectively in respective service areas of the different kinds of networks; a data communication control section which controls the data communications of a plurality of radio communication sections by their own first control commands of respective radio communication sections; and a command conversion section which carries out conversion of the first control commands used by the data communication control section and a second control command used for a communication with the information terminal.

As a result, despite whether data communication is conducted by way of the wireless LAN or the wireless WAN, the data communication in the wireless LAN and the wireless WAN can be conducted seamlessly without worrying about kinds of control command and control sequence for controlling the portable communication terminal from view point of the information terminal. Namely, a method of controlling data communication can be readily conducted, even if the portable communication terminal has functions of both wireless WAN and wireless LAN. Further, even if the wireless WAN or the wireless LAN is effective in the information terminal, an user of the information terminal can be prevented from being confused due to different operations of the wireless WAN and the wireless LAN on the information terminal. Furthermore, even if the control commands in the wireless WAN is restricted to the NDIS protocol, application software installed in the information terminal can be prevented from being inoperable. Moreover, a period for a development of the portable communication terminal can be prevented from being extended on the ground that a wireless WAN data communication control block is unable to be used.

While the present invention has thus far been described in conjunction with only a preferred embodiment thereof, it will now be readily possible for those skilled in the art to put this invention into various other manners.

For example, in the above embodiment, description was made as regards an example of operations in a case that data communication in the wireless WAN is switched into data communication in the wireless LAN. The present invention can also be applied to an example of operations in a case that data communication in the wireless LAN is switched into data communication in the wireless WAN.

Further, in the above embodiment, description was made as regards the wireless WAN and the wireless LAN. The present invention can also be applied to a case between pluralities of different kinds of networks. Moreover, in the data communication in the wireless LAN, the present invention can also be applied to a network standard connected on IP (Internet Protocol) base other than IEEE (Institute of Electrical and Electronics Engineers) 802.11b.

What is claimed is:

1. A portable communication terminal which is capable of communicating with an information terminal between different kinds of networks, comprising:
   a plurality of radio communication sections which carry out data communications, respectively in respective service areas of said different kinds of networks;
   a data communication control section which controls said data communications of said a plurality of radio communication sections by their own first control commands of respective radio communication sections; and
   a command conversion section which carries out conversion of said first control commands used by said data communication control section and a second control command used for a communication with said information terminal.

2. A portable communication terminal which is capable of communicating with an information terminal in an wireless WAN and an wireless LAN, comprising:
   a wireless WAN communication section which has a function of access to said wireless WAN;
   a wireless LAN communication section which has a function of access to said wireless LAN;
   a wireless LAN data communication control section which controls data communication of said wireless LAN communication section by a control command of said wireless LAN and which simultaneously communicating with said information terminal at the control command of said wireless LAN;

a wireless WAN data communication control section which controls data communication of said wireless WAN communication section by a control command of said wireless WAN; and a wireless WAN command conversion section which carries out conversion of said control command of said wireless WAN and said control command of said wireless LAN between said wireless WAN data communication control section and said information terminal.

3. A portable communication terminal which is capable of communicating with an information terminal in an wireless WAN and an wireless LAN as claimed in claim 2, wherein communication is carried out between said portable communication terminal and said information terminal by a control protocol for said wireless LAN communication section.

4. A portable communication terminal which is capable of communicating with an information terminal in an wireless WAN and an wireless LAN as claimed in claim 2, wherein said wireless WAN command conversion section converts said control command of said wireless WAN into said control command of said wireless LAN during an wireless WAN data reception while said wireless WAN command conversion section converts said control command of said wireless LAN into said control command of said wireless WAN during an wireless WAN data transmission.

5. A portable communication terminal which is capable of communicating with an information terminal in an wireless WAN and an wireless LAN as claimed in claim 2, wherein said wireless WAN command conversion section converts an NDIS command as a control command for said wireless LAN communication section into an AT command as a control command for said wireless WAN communication section.

6. A portable communication terminal which is capable of communicating with an information terminal in an wireless WAN and an wireless LAN as claimed in claim 2, wherein said wireless WAN command conversion section converts a first control information including a report for an radio wave condition during data reception and charging information into a second control information capable of being used in said wireless LAN communication section and then transfers the second control information to said information terminal.

7. A portable communication terminal which is capable of communicating with an information terminal in an wireless WAN and an wireless LAN as claimed in claim 2, wherein said wireless LAN data communication control section, said wireless WAN command conversion section have functions to constitute or dissolve transmission and reception data from said portable communication terminal to said information terminal or from said information terminal to said portable communication terminal into a packet array defined by LAN, respectively.

8. A portable communication terminal which is capable of communicating with an information terminal in an wireless WAN and an wireless LAN as claimed in claim 7, wherein said wireless LAN data communication control section, said wireless WAN command conversion section have functions to divide or combine each packet of said transmission and reception data into a designated packet size, respectively.

9. A portable communication terminal which is capable of communicating with an information terminal in an wireless WAN and an wireless LAN as claimed in claim 2, further comprising a portable communication apparatus external interface block with respect to said information terminal, wherein data interfaces carrying out transmission and reception of said data, a transfer of said control command, independently, are formed between said portable communication apparatus external interface block and said wireless WAN command conversion section, said wireless LAN data communication control section, respectively.

10. A portable communication terminal which is capable of communicating with an information terminal in an wireless WAN and an wireless LAN as claimed in claim 9, wherein a data interface for transferring the control command, a data interface for transferring the transmission and reception data, and a data interface for transferring information that data communication in said wireless LAN and in said wireless WAN become effective are formed in parallel by separate paths between said portable communication apparatus external interface block and said information terminal.

11. A portable communication terminal which is capable of communicating with an information terminal in an wireless WAN and an wireless LAN as claimed in claim 10, wherein said data interface for transferring the control command, said data interface for transferring the transmission and reception data, and said data interface for transferring information that data communication in said wireless LAN and in said wireless WAN become effective each between said portable communication apparatus external interface block and said information terminal are formed by USB interfaces, respectively.

12. A portable communication terminal which is capable of communicating with an information terminal in an wireless WAN and an wireless LAN as claimed in claim 2, wherein said wireless WAN command conversion section, at the time of access to said wireless WAN, informs said wireless LAN communication section that the wireless WAN is effective at the present and makes said wireless LAN communication section stop the communication, and wherein said wireless LAN data communication control section, at the time of access to said wireless LAN, informs said wireless WAN communication section that the wireless LAN is effective at the present and makes said wireless WAN communication section stop the communication.

13. A portable communication terminal which is capable of communicating with an information terminal in an wireless WAN and an wireless LAN as claimed-in claim 12, wherein an wireless LAN effective line is formed between said wireless WAN command conversion section and said wireless LAN data communication control section while an wireless WAN effective line is formed between said wireless WAN data communication control section and said wireless LAN data communication control section, said wireless LAN effective line becoming active for informing that the wireless LAN is effective at the present from said wireless LAN data communication control section to said wireless WAN command conversion section, and said wireless WAN effective line becoming active for informing that the wireless WAN is effective at the present from said wireless WAN data communication control section to said wireless LAN data communication control section.

14. A portable communication terminal which is capable of communicating with an information terminal in an wireless WAN and an wireless LAN as claimed in claim 12, wherein information that data communication in the wireless WAN is effective at the present is sent to said information terminal and displayed in the information terminal at the time of access to said wireless WAN, and wherein information that data communication in the wireless LAN is effective at the present is sent to said information terminal and displayed in the information terminal at the time of access to said wireless LAN.

15. A portable communication terminal which is capable of communicating with an information terminal in an wireless WAN and an wireless LAN as claimed in claim 2, wherein said wireless LAN data communication control section requests said information terminal an admittance procedure of the wireless LAN and said information terminal is informed that said data communication in the wireless LAN is effective after completion of said admittance procedure of the wireless LAN, when switching from said wireless WAN into said wireless LAN is carried out, and wherein said wireless WAN command conversion section requests said information terminal an admittance procedure of the wireless WAN and said information terminal is informed that said data communication in the wireless WAN is effective after completion of said admittance procedure of the wireless WAN, when switching from said wireless LAN into said wireless WAN is carried out.

16. A method of converting a control protocol of a portable communication terminal which is capable of communicating with an information terminal between different kinds of networks, said method comprising the steps of:

carrying out data communications separately in respective service areas of said different kinds of networks;

controlling said data communications by control commands used in respective networks; and carrying out conversion of said control commands used in respective networks and a control command used in said information terminal.

\* \* \* \* \*